United States Patent [19]
Mori et al.

[11] Patent Number: 5,409,881
[45] Date of Patent: Apr. 25, 1995

[54] THERMOSENSITIVE RECORDING MATERIAL

[75] Inventors: Yasutomo Mori, Numazu; Mitsuru Naruse, Shizuoka; Kunihiko Hada, Numazu; Motoo Tasaka, Susono, all of Japan

[73] Assignee: Ricoh Company, Ltd., Tokyo, Japan

[21] Appl. No.: 996,064

[22] Filed: Dec. 23, 1992

[30] Foreign Application Priority Data

Dec. 27, 1991 [JP] Japan .................................. 3-360355
Dec. 28, 1991 [JP] Japan .................................. 3-360365
Mar. 23, 1992 [JP] Japan .................................. 4-095893
Mar. 26, 1992 [JP] Japan .................................. 4-100726

[51] Int. Cl.⁶ .............................................. B41M 5/40
[52] U.S. Cl. .................................. 503/207; 427/152; 503/200; 503/226
[58] Field of Search ................... 503/200, 226, 206

[56] References Cited

U.S. PATENT DOCUMENTS 4,985,394  1/1991  Mori et al. ........................ 503/226
5,210,066  5/1993  Sakurai et al. ..................... 503/226

Primary Examiner—Pamela R. Schwartz
Attorney, Agent, or Firm—Oblon, Spivak, McClelland, Maier & Neustadt

[57] ABSTRACT

A thermosensitive recording material composed of a support, a thermosensitive recording layer formed on the support, capable of producing colored images by heating, and a protective layer formed on the thermosensitive recording layer, which contains as a resin component a copolymer resin obtained by copolymerization of arylamide or methacrylamide, acrylonitrile, and a vinyl monomer having a carboxyl group, or a copolymer resin of a core-shell emulsion type obtained by copolymerization of acrylamide and/or methacrylamide in the presence of a seed emulsion of an acryl-based copolymer or methacryl-based copolymer, and as a crosslinking agent a compound having two or more alkyleneimino groups, a carbodiimide compound, a methyl ethyl ketoxime compound, or bis(β-hydroxyethyl)sulfone.

27 Claims, No Drawings

THERMOSENSITIVE RECORDING MATERIAL

BACKGROUND OF THE INVENTION

1. Field of the Invention

The present invention relates to a thermosensitive recording material, and more particularly to an improved thermosensitive recording material comprising a support and a thermosensitive coloring layer formed thereon, which is colored by the application of heat thereto.

2. Discussion of Background

Generally, a thermosensitive recording material prepared by forming on a support, such as a sheet of paper or a film, a thermosensitive coloring layer which comprises as the main component a thermasensitive coloring composition is capable of producing a colored image by heating with a thermal head, thermal pen, laser beam or stroboscopic lamp. This type of recording material is advantageous over other conventional recording materials because the recording can be speedily achieved by a simple process with a relatively compact device. Noise development and environmental problems can be minimized, and the manufacturing cost of the recording material is low. Owing to the above-mentioned advantages of the thermosensitive recording material, it is utilized in a wide number of fields such as facsimile machines, electronic computer terminals, recorders and automatic vending machines for labels and tickets.

The thermosensitive coloring composition for use in such a thermosensitive recording material comprises a coloring agent and a color developer capable of inducing color formation in the coloring agent upon application of heat thereto. Specifically, a colorless to light-colored leuco dye with a lactone or lactam, or a spiropyran ring is employed as the coloring agent. An organic acid or phenolic material is conventionally used as the color developer. The recording material employing the combination of the above-mentioned coloring agent and color developer is capable of producing images with clear tone, while maintaining a high degree of whiteness of the background. In addition, the weather-resistance of the obtained images is superior.

However, the thermosensitive recording material has the shortcomings that the recorded images easily fade when brought into contact with water or plasticizers such as dioctyl adipate (DOA) ad dioctyl phthalate (DOP), and that the background of the recording material is easily colored when brought into contact with oil, or solvents such as ethanol and ethyl acetate. The reliability of the images recorded on the thermosensitive recording material is not satisfactory.

To solve the aforementioned reliability problem, the provision of a protective layer on the thermosensitive coloring layer has been proposed as disclosed in Japanese Laid-Open Patent Applications 54-128347 and 54-3594. In addition, it is disclosed in Japanese Laid-Open Patent Applications 56-126193 and 56-13993 that the protective layers comprising water-soluble resins, for example, vinyl alcohol or modified materials thereof, and starch or modified materials thereof are effective in improving resistance to oil and plasticizer of the obtained thermosensitive recording material.

However, the water resistance of such a protective layer comprising the water-soluble resin is poor, so that the protective layer is easily peeled off when brought into contact with water. To improve the water resistance, the protective layer is often prepared by curing with a crosslinking agent as is outlined in Japanese Laid-Open Patent Application 57-188392. Various combinations of the water-soluble resin and the crosslinking agent are conventionally proposed.

For instance, the combination of polyvinyl alcohol and an epoxy compound with two or more epoxy groups or an ethylene-imine compound with two or more ethylene-imine groups is proposed in Japanese Laid-Open Patent Application 60-68990. The combination of casein and a compound having a methylol group has been proposed in Japanese Laid-Open Patent Application 60-193693; the combination of a copolymer of acrylamide—acrylonitrile—a carboxyl-group-containing vinyl compound, and an epoxy resin in Japanese Laid-Open Patent Application 61-37467; and the combination of polyvinyl alcohol and a 2,4-dihydroxy-1,4-dioxane derivative in Japanese Laid-Open Patent Application 62-44494. Furthermore, bis(4-glycidyloxyphenyl)sulfone is used as the crosslinking agent as disclosed in Japanese Laid-Open Patent Application 62-270382.

However, the pot life of coating liquids for the protective layer comprising some of the above crosslinking agents is short because these coating liquids tend to thicken with time, and the crosslinking efficiency of such a crosslinking agent as an ethylene-imine compound deteriorates with time. Although the pot life of the coating liquids is not short, the water resistance is insufficient.

In addition, the method of using the water-soluble resin and the crosslinking agent in combination to prepare a coating liquid for the protective layer has the shortcomings that the sensitivity of the obtained recording material is decreased, and the matching properties of the recording material to a thermal head are degraded. Therefore, the thermofusible material of the recording material adheres to the thermal head and consequently, the recorded images become blurred.

SUMMARY OF THE INVENTION

Accordingly, an object of the present invention is to provide a thermosensitive recording material free from the above-mentioned conventional shortcomings, having high resistance to heat, plasticizer, and water, and excellent matching properties with the thermal head, capable of producing colored images thereon with high density, and maintaining the same without color development of the background of the recording material.

The above-mentioned object of the present invention can be achieved by a thermosensitive recording material comprising a support, a thermosensitive recording layer formed on the support, capable of producing colored images by heating, and a protective layer formed on the thermosensitive recording layer which comprises a resin component comprising a copolymer resin obtained by copolymerization of acrylamide or methacrylamide, acrylonitrile, and a vinyl monomer having a carboxyl group, or a copolymer resin of a core-shell emulsion type obtained by copolymerization of acrylamide and/or methacrylamide in the presence of a seed emulsion of an acryl-based copolymer or methacryl-based copolymer; and a crosslinking agent comprising at least one selected from the group consisting of a compound having two or more alkyleneimino groups of formula (I), a carbodiimide compound, a methyl ethyl ketoxime compound having a group of formula (II) and bis ($\beta$-hydroxyethyl) sulfone having formula (III):

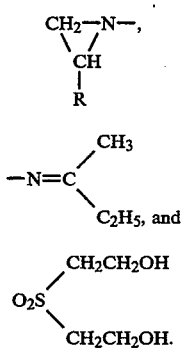

[Formula I]

[Formula II]

[Formula III]

DESCRIPTION OF THE PREFERRED EMBODIMENTS

When the copolymer resin (hereinafter referred to as "resin A1") obtained by copolymerization of acrylamide or methacrylamide, acrylonitrile, and a vinyl monomer having a carboxyl group is used in the protective layer of the thermosensitive recording material, it is preferable that the ratio by wt. % of each monomer, that is, acrylamide or methacrylamide, acrylonitrile, and a vinyl monomer having a carboxyl group be (45 to 85):(10 to 50):(3 to 20).

Examples of the aforementioned vinyl monomer having a carboxyl group include acrylic acid, methacrylic acid, maleic acid and the derivatives thereof. Acrylic acid, methacrylic acid and maleic acid are preferably employed as the vinyl monomer in the present invention.

The above-mentioned resin A1 can be prepared by a conventional method. More specifically, a peroxide serving as a polymerization initiator is added to an aqueous solution containing a mixture of the monomers, acrylamide or methacrylamide, acrylonitrile, and a vinyl monomer having a carboxyl group, at a concentration of 50 to 65 wt. %. The thus obtained mixture was quantitatively added to boiling water over a period of 2 to 4 hours to cause a polymerization reaction. The reaction was further continued for 2 to 4 hours. In this case, the weight ratio of the aqueous solution containing a mixture of monomers to a mixture of the boiling water and the polymerization initiator may appropriately be adjusted so that the concentration of the polymer is 25 to 40 wt. %.

The water-soluble peroxide is preferred as the polymerization initiator. Examples of the peroxide serving as the polymerization initiator include hydrogen peroxide, tert-butyl hydroperoxide, ammonium persulfate and potassium persulfate. The amount of the polymerization initiator, which is not specifically limited, is desirably 0.1 to 2.0 wt. % of the total weight of the mixture of the monomers. When the polymerization reaction is carried out at high polymerization temperature, the polymerization reaction speedily proceeds and the composition of the monomers can become uniform in the obtained protective layer. In particular, when the polymerization temperature is set at the boiling point of the reaction mixture, the polymerization is most efficiently carried out. The conversion is appropriately determined with the required characteristics of the protective layer and the workability such as coating properties of the coating liquid for the protective layer taken into consideration. For example, a commercially available product "Hari coat TS20" (Trademark), made by Harima Chemicals, Inc., can be used as this type of copolymer resin A1.

In the protective layer, a copolymer resin (hereinafter referred to as "resin A2") of core-shell emulsion type obtained by copolymerization of acrylamide and/or methacrylamide in the presence of a seed emulsion of an acryl-based copolymer or methacryl-based copolymer may be used as the resin component. The resin A2 is of function-separating type, so that it has a preferable effect in the barrier properties and the head-matching properties of the obtained thermosensitive recording material. The resin A2 can be prepared by a conventional method, and for example, a commercially available product "XFE1845" (Trademark), made by Mitsui Toatsu Chemical, Inc., can be used as the resin A2.

When the previously mentioned resins A1 and A2 are prepared by polymerization, other copolymerizable monomers may be used together with the above-mentioned monomers when necessary.

The protective layer of the thermosensitive recording material according to the present invention comprises as the resin component the resin A1 or resin A2. In addition, the resins which are conventionally used in the protective layer of the thermosensitive recording material may be used in combination with the resin A1 or resin A2.

Examples of the resin conventionally used in the protective layer include natural resins such as sodium alginate, starch, casein and cellulose; and synthetic resins. Of the conventional resins, polyvinyl alcohol, polycarboxylic acid compounds, polyacrylamide, and modified materials and derivatives thereof are preferred from the viewpoints of the reactivity with such a crosslinking agent as aziridine to be described later, and the film-forming properties of the protective layer. In these modified materials and derivatives of polyvinyl alcohol, polycarboxylic acid compounds, and polyacrylamide, other components are added to polyvinyl alcohol, polycarboxylic acid compounds, or polyacrylamide by copolymerization or graft polymerization. Alternatively, the above-mentioned other components may be linked to polyvinyl alcohol, polycarboxylic acid compounds, or polyacrylamide as a pendant.

Furthermore, with respect to the above-mentioned polyvinyl alcohol, epoxy-group-modified polyvinyl alcohol, silanol-group-modified polyvinyl alcohol, acetoacetyl-group-modified polyvinyl alcohol, acrylamide-modified polyvinyl alcohol, butyral-group-modified polyvinyl alcohol—maleic acid copolymer, N-methylolurethane-modified polyvinyl alcohol, amino-group-modified polyvinyl alcohol and completely-saponified polyvinyl alcohol are preferred. The saponification degree of the above-mentioned completely-saponified polyvinyl alcohol is preferably 0.5% or less. Of these polyvinyl alcohols, epoxy-group-modified polyvinyl alcohol is most preferable.

In the polycarboxylic acid compounds, styrene—acrylic acid copolymer, acrylic acid ester—acrylic acid copolymer, styrene—acrylic acid ester—acrylic acid copolymer, styrene—maleic acid copolymer, isobutylene—maleic anhydride copolymer and derivatives thereof, and styrene—acrylic acid—acrylamide copolymer are preferred. In particular, isobutylene—maleic anhydride copolymer and derivatives thereof, and styrene—acrylamide copolymer are preferably employed in the present invention.

In addition, aqueous emulsion resins such as polyethyleneimine, aqueous polyester, aqueous polyurethane, polyester, polyurethane, acrylate-based (co)polymer, epoxy resin, polyvinyl acetate, polyvinylidene chloride, polyvinyl chloride, and derivatives thereof can be used together with the previously mentioned resins A1 and A2.

In the thermosensitive recording material of the present invention, the crosslinking agent is used in combination with the aforementioned resin component A1 or A2 in the protective layer, so that the resistance to water, plasticizer, and heat of the recording material can be improved.

The crosslinking agent for use in the present invention comprises at least one selected from the group consisting of;

a compound having two or more alkyleneimino groups of formula (I) (hereinafter referred to as a crosslinking agent B1):

$$\begin{array}{c} CH_2-N- \\ \diagdown \phantom{xx} \diagup \\ CH \\ | \\ R \end{array}$$ [Formula I]

a carbodiimide compound (hereinafter referred to as a crosslinking agent B2);

a methyl ethyl ketoxime compound having a group of formula (II) (hereinafter referred to as a crosslinking agent B3):

$$-N=C\begin{array}{c} CH_3 \\ \diagdown \\ C_2H_5; \end{array}$$ [Formula II]

and bis(β-hydroxyethyl)sulfone having formula (III) (hereinafter referred to as a crosslinking agent B4):

$$O_2S\begin{array}{c} CH_2CH_2OH \\ \diagdown \\ CH_2CH_2OH. \end{array}$$ [Formula III]

An aziridine compound is preferably used as the aforementioned crosslinking agent B1 from the viewpoint of water-resistance.

Specific examples of the aziridine compound are as follows:

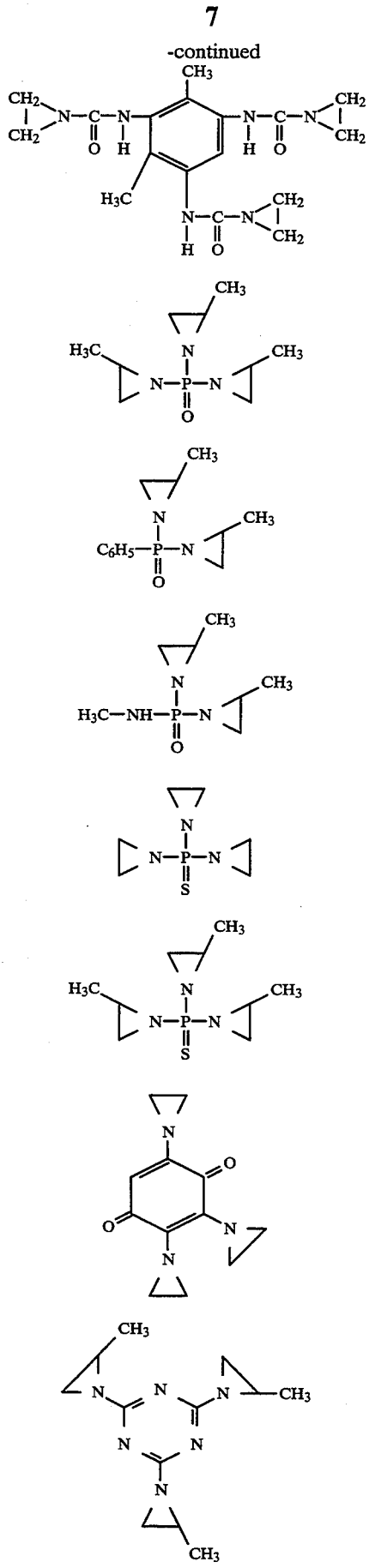

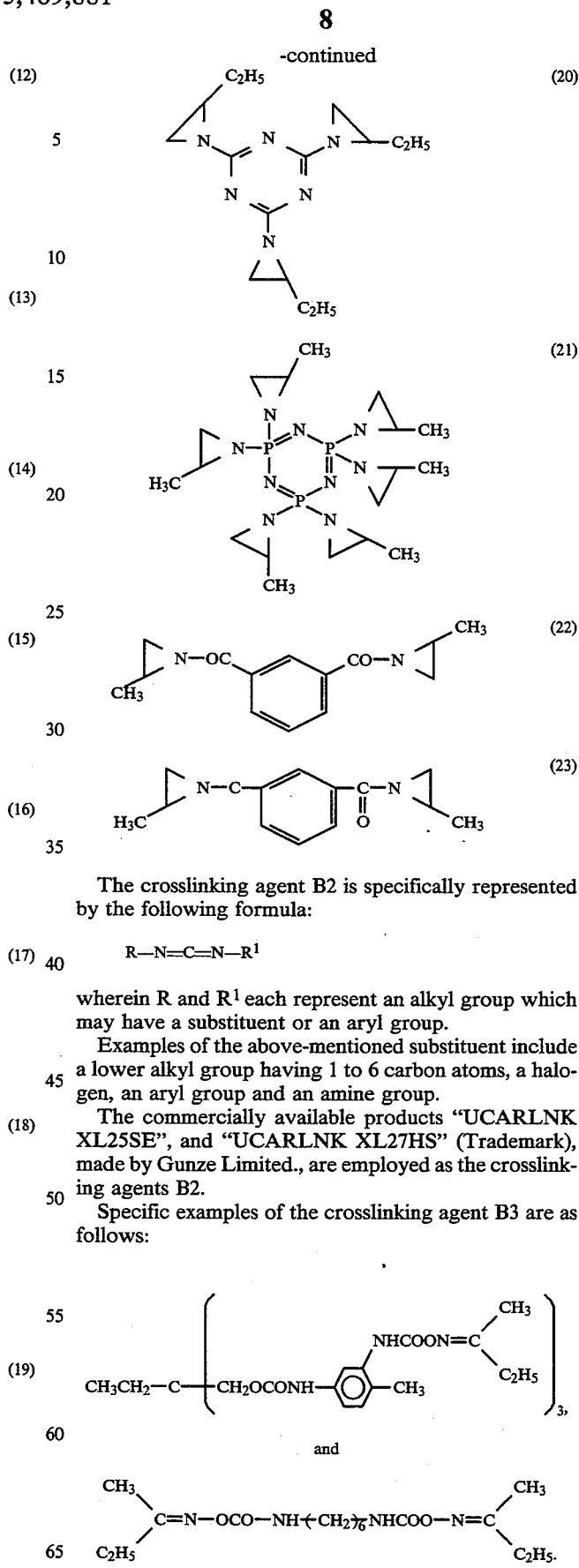

The crosslinking agent B2 is specifically represented by the following formula:

$$R-N=C=N-R^1$$

wherein R and $R^1$ each represent an alkyl group which may have a substituent or an aryl group.

Examples of the above-mentioned substituent include a lower alkyl group having 1 to 6 carbon atoms, a halogen, an aryl group and an amine group.

The commercially available products "UCARLNK XL25SE", and "UCARLNK XL27HS" (Trademark), made by Gunze Limited., are employed as the crosslinking agents B2.

Specific examples of the crosslinking agent B3 are as follows:

In the present invention, the protective layer of the thermosensitive recording material may comprise the conventionally known crosslinking agents such as formalin, chrome alum, glyoxal, boric acid, amine compounds, epoxy compounds, polyamide epichlorohydrin compounds, glycidyl compounds, methylol compounds, and ethylene-imine compounds, in addition to the above-mentioned crosslinking agents B1 to B4.

The protective layer of the thermosensitive recording material according to the present invention may further comprise a pigment. The weight ratio of the pigment to the resin is preferably 1 or less in the protective layer.

In the present invention, a silicon oxide compound is preferred as the pigment for use in the protective layer. Specific examples of the silicon oxide compound are silicon dioxide, calcium silicate, magnesium silicate, aluminum silicate, and zinc silicate. Of these silicon oxide compounds, silicon dioxide, calcium silicate and magnesium silicate are particularly preferable. In addition, silicon oxide compounds which are surface-treated by a fatty acid, calcium carbonate or a silane coupling agent may be employed.

It is preferable that the pigment for use in the protective layer have an average particle diameter of 0.1 $\mu$m or less. The oil absorption of the pigment is preferably 100 cc/100 g or less, and the specific surface area thereof is preferably 100 m$^2$/g or more.

Furthermore, the above-mentioned silicon oxide compounds may be used in combination with other oil-absorbent pigments, for example, an inorganic pigment such as zinc oxide, calcium carbonate, barium sulfate, titanium oxide, lithopone, talc, agalmatolite, kaolin, aluminum hydroxide, or calcined kaolin; and an organic pigment such as urea-formaldehyde resin or polyethylene powder.

The protective layer for use in the present invention may further comprise auxiliary additive components such as a filler, a surface active agent., an ultraviolet absorbing agent, a thermofusible material (or lubricant) and an agent for preventing color formation by pressure application, which are used in the conventional thermosensitive recording materials when necessary.

Examples of the filler for use in the present invention are finely-divided particles of an inorganic filler such as calcium carbonate, silica, zinc oxide, titanium oxide, aluminum hydroxide, zinc hydroxide, barium sulfate, clay talc, surface-treated calcium and surface-treated silica, and finely-divided particles of an organic filler such as urea-formaldehyde resin, styrene—methacrylic acid copolymer and polystyrene resin.

Examples of the above-mentioned thermofusible material include higher fatty acids, and esters, amides and metallic salts thereof, for example, zinc stearate, calcium stearate and aluminum stearate; a variety of waxes such as polyethylene wax, carnauba wax, paraffin wax, and microcrystalline wax; a condensate of aromatic carboxylic acid and amine; fatty amide; phenyl benzoate; higher straight-chain glycol; dialkyl 3,4-epoxy-hexahydrophthalate; higher ketone; p-benzylbiphenyl; and other thermofusible organic compounds with a melting point of about 50° to 200° C.

To obtain colored images in the thermosensitive recording material of the present invention by the application of heat thereto, the coloring reaction between a leuco dye and a color developer, the reaction between a diazo compound and a coupler, and the reaction between isocyanate and amine can be utilized effectively. The present invention will now be explained when the leuco dye and the color developer are used to cause color development in the thermosensitive recording material of the present invention.

As the leuco dyes for use in the thermosensitive recording layer, any conventional leuco dyes used in conventional thermosensitive recording materials can be employed alone or in combination. For example, triphenylmethane leuco compounds, fluoran leuco compounds, phenothiazine leuco compounds, auramine leuco compounds, spiropyran leuco compounds, and indolinophthalide leuco compounds are preferably employed.

Specific examples of those leuco dyes are as follows:
3,3-bis(p-dimethylaminophenyl)phthalide,
3,3-bis(p-dimethylaminophenyl)-6-dimethylaminophtalide (or Crystal Violet Lactone),
3,3-bis(p-dimethylaminophenyl)-6-diethylaminophtalide,
3,3-bis(p-dimethylaminophenyl)-6-chlorophthalide,
3,3-bis(p-dibutylaminophenyl)phthalide,
3-cyclohexylalmino-6-chlorofluoran,
3-dimethylamino-5,7-dimethylfluoran,
3-N-methyl-N-isobutyl-6-methyl-7-anilinofluoran,
3-N-ethyl-N-isoamyl-6-methyl-7-anilinofluoran,
3-diethylamino-7-chlorofluoran,
3-diethylamino-7-methylfluoran,
3-diethylamino-7,8-benzfluoran,
3-diethylamino-6-methyl-7-chlorofluoran,
3-(N-p-tolyl-N-ethylamino)-6-methyl-7-anilinofluoran,
3-pyrrolidino-6-methyl-7-anilinofluoran,
2-[N-(3'-trifluoromethylphenyl)amino]-6-diethylaminofluoran,
2-[3,6-bis(diethylamino)-9-(o-chloroanilino)xanthylbenzoic acid lactam],
3-diethylamino-6-methyl-7-(m-trichloromethylanilino)fluoran,
3-diethylamino-7-(o-chloroanilino)fluoran,
3-dibutylamino-7-(o-chloroanilino)fluoran,
3-N-methyl-N-amylamino-6-methyl-7-anilinofluoran,
3-N-methyl-N-cyclohexylamino-6-methyl-7-anilinofluoran,
3-diethylamino-6-methyl-7-anilinofluoran,
3-diethylamino-6-methyl-7-(2',4'-dimethylanilino)fluoran,
3-(N,N-diethylamino)-5-methyl-7-(N,N-dibenzylamino)fluoran, benzoyl leuco methylene blue,
6'-chloro-8'-methoxy-benzoindorino-spiropyran,
6'-bromo-3'-methoxy-benzoindolino-spiropyran,
3-(2'-hydroxy-4'-dimethylaminophenyl)-3-(2'-methoxy-5'chlorophenyl)phthalide,
3-(2'-hydroxy-4'-dimethylaminophenyl)-3-(2'-methoxy-5'nitrophenyl)phthalide,
3-(2'-hydroxy-4'-diethylmninophenyl)-3-(2'-methoxy-5'methylphenyl)phthalide,
3-(2'-methoxy-4'-dimethylaminophenyl)-3-(2'-hydroxy-4'-chloro-5'-methylphenyl)phthalide,
3-morpholino-7-(N-propyl-trifluoromethylanilino)fluoran,
3-pyrrolidino-7-trifluoromethylanilinofluoran,
3-diethylamino-5-chloro-7-(N-benzyl-trifluoromethylanilino)fluoran,
3-pyrrolidino-7-(di-p-chlorophenyl)methylaminofluoran,
3-diethylamino-5-chloro-7-(-phenylethylamino)fluoran,
3-(N-ethyl-p-toluidino)-7-(α-phenylethylamino)fluoran,
3-diethylamino-7-(o-methoxycarbonylphenylamino)fluoran,
3-diethylamino-5-methyl-7-(α-phenylethylamino)fluoran, 3-diethylamino-7-piperidinofluoran,
2-chloro-3-(N-methyltoluidino)-7-(p-n-butylanilino)-fluoran,
3-(N-methyl-N-isopropylamino)-6-methyl-7-anilinofluoran,
3-dibutylamino-6-methyl-7-anilinofluoran,
3,6-bis(dimetylamino)fluorenespiro(9,3′)-6′-dimethylaminophthalide,
3-(N-benzyl-N-cyclohexylamino)-5,6-benzo-7-α-naphthylamino-4′-bromofluoran,
3-diethylamino-6-chloro-7-anilinofluoran,
3-N-ethyl-N-(2-ethoxypropyl)amino-6-methyl-7-anilinofluoran,
3-N-ethyl-N-tetrahydrofurfurylamino-6-methyl-7-anilinofluoran,
3-diethylamino-6-methyl-7-mesidino-4′,5′-benzofluoran, and
3-N-ethyl-N-isobutyl-6-methyl-7-anilinofluoran.

In the present invention, various electron acceptors, for example, phenolic compounds, thiophenolic compounds, thiourea derivatives, and organic acids and metallic salts thereof, which are capable of inducing color formation in the aforementioned leuco dye, can be preferably employed as the color developers in the thermosensitive recording layer.

Specific examples one such color developers are as follows:
4,4′-isopropylidenebisphenol,
4,4′-isopropylidenebis(o-methylphenol),
4,4′-sec-butylidenebisphenol,
4,4′-isopropylidenebis(2-tert-butylphenol),
4,4′-cyclohexylidenediphenol,
4,4′-isopropylidenebis(2-chlorophenol),
2,2′-methylenebis(4-methyl-6-tert-butylphenol),
2,2′-methylenebis(4-ethyl-6-tert-butylphenol),
4,4′-butylidenebis(6-tert-butyl-2-methylphenol),
1,1,3-tris(2-methyl-4-hydroxy-5-tert-butylphenyl)butane,
1,1,3-tris(2-methyl-4-hydroxy-5-cyclohexylphenyl)butane,
4,4′-thiobis(6-tert-butyl-2-methylphenol),
4,4′-diphenolsulfone,
4-isopropoxy-4′-hydroxydiphenylsulfone,
4-benzyloxy-4′-hydroxydiphenylsulfone,
4,4′-diphenolsulfoxide,
isopropyl p-hydroxy benzoate,
benzyl p-hydroxy benzoate,
benzyl protocatechuate,
stearyl gallate,
lauryl gallate,
octyl gallate,
1,7-bis(4-hydroxyphenylthio)-3,5-dioxaheptane,
1,5-bis(4-hydroxyphenylthio)-3-oxapentane,
1,3-bis(4-hydroxyphenylthio)-propane,
1,3-bis(4-hydroxyphenylthio)-2-hydroxypropane,
N,N′-diphenylthiourea,
N,N′-di(m-chlorophenyl)thiourea,
salicylanilide,
5-chloro-salicylanilide,
2-hydroxy-3-naphthoic acid,
2-hydroxy-1-naphthoic acid,
1-hydroxy-2-naphthoic acid,
zinc hydroxynaphthoate,
aluminum hydroxynaphthoate,
calcium hydroxynaphthoate,
bis(4-hydroxyphenyl)methyl acetate,
bis(4-hydroxyphenyl)benzyl acetate,
1,3-bis(4-hydroxycumyl)benzene,
1,4-bis(4-hydroxycuyl)benzene,
2,4′-diphenolsulfone,
3,3′-diallyl-4,4′-diphenolsulfone,
α,α-bis(4-hydroxyphenyl)-α-methyltoluene,
antipyrine complex of zinc thiocyanate,
tetrabromobisphenol A, and
tetrabromobisphenol S.

To obtain a thermosensitive recording material according to the present invention, a variety of conventional binder agents can be employed for binding the above-mentioned leuco dyes and color developers to a support of the thermosensitive recording material.

Examples of the binder agents are water-soluble polymers; such as polyvinyl alcohol, carboxy-modified polyvinyl alcohol, starch, and starch derivatives, cellulose derivatives such as hydroxymethylcellulose, hydroxyethylcellulose, carboxymethylcellulose, methylcellulose, and ethylcellulose, sodium polyacrylate, polyvinyl pyrrolidone, acrylamide—acrylic acid ester copolymer, acrylamide—acryl acid ester—methacrylic acid terpolymer, alkali salts of styrene—maleic anhydride copolymer, alkali salts of ethylene—maleic anhydride copolymer, alkali salts of isobutylene—maleic anhydride copolymer, polyacrylamide, sodium alginate, gelatin, and casein; emulsions such as polyvinyl acetate, polyurethane, polyacrylic acid, polyacrylic acid ester, vinyl chloride—vinyl acetate copolymer, polybutyl methacrylate, and ethylene—vinyl acetate copolymer; and latexes such as styrene—butadiene copolymer and styrene—butadiene copolymer, and styrene—butadiene—acryl-based copolymer.

The thermosensitive recording layer for use in the present invention may also further comprise auxiliary additive components such as a filler, a surface active agent, a thermofusible material (or lubricant) and an agent for preventing color formation by pressure application, which are used in the conventional thermosensitive recording materials when necessary. Examples of the filler and the thermofusible material are the same as previously described in the case of the protective layer.

In the thermosensitive recording material of the present invention, an undercoat layer may be interposed between the support and the thermosensitive recording layer. It is preferable that the undercoat layer for use in the present invention comprise the same resin component, and the same crosslinking agent, as used in the protective layer. More specifically, it is preferable that a resin component in the undercoat layer comprise a copolymer resin obtained by copolymerization of acrylamide or methacrylamide, acrylonitrile, and a vinyl monomer having a carboxyl group, or a copolymer resin of a core-shell emulsion type obtained by copolymerization of acrylamide and/or methacrylamide in the presence of a seed emulsion of an acryl-based copolymer or methacryl-based copolymer; and that a crosslinking agent comprise at least one selected from the group consisting of a compound having two or more alkyleneimino groups, a carbodiimide compound, a methyl ethyl ketoxime compound and bis(β-hydroxyethyl)sulfone.

In addition to the above, a backcoat layer may be provided on the back side of the support, opposite to the thermosensitive recording layer with respect to the support. It is desirable that the backcoat layer also comprise the same resin component, and the same crosslinking agent, as used in the protective layer.

Owing to the provision of the above-mentioned undercoat layer or backcoat layer, penetrating of water and chemicals from the back side of the support to the thermosensitive recording layer can be effectively prevented, thereby improving the resistance to water and chemicals of the recording material.

Furthermore, a plurality of protective layers for use in the present invention may be provided on the thermosensitive recording layer.

In the thermosensitive recording material of the present invention, an intermediate layer comprising as the main component expanded plastic minute void particles may be interposed between the support and the thermosensitive recording layer.

In the above-mentioned expanded plastic minute void particle for use in the intermediate layer, air or other gasses are contained in a shell comprising a thermoplastic resin such as polystyrene, polyvinyl chloride, polyvinylidene chloride, polyvinyl acetate, polyacrylic acid ester, polyacrylonitrile, polybutadiene and copolymer resins thereof. The intermediate layer for use in the present invention can be prepared by a conventional method.

The thermosensitive recording material according to the present invention can be employed in various fields. In particular, the thermosensitive recording material of the present invention can conveniently be used as a thermosensitive recording adhesive label sheet or a thermosensitive recording magnetic ticket sheet by utilizing the advantages of superiority of colored images and thermalstability of the background of the recording material. In preparing the thermosensitive recording adhesive label sheet, the thermosensitive recording layer comprising the previously mentioned leuco dye and color developer and the above-mentioned protective layer are successively overlaid on the front side of the support, and an adhesive layer is formed on the back side of the support, with a disposable backing sheet attached to the adhesive layer.

In the case of the thermosensitive recording magnetic ticket sheet, a magnetic recording layer comprising as the main components a ferromagnetic substance and a binding agent may be provided instead of the above-mentioned disposable backing sheet.

Other features of this invention will become apparent in the course of the following description of exemplary embodiments, which are given for illustration of the invention and are not intended to be limiting thereof.

Examples 1 to 8 and Comparative Examples 1 to 6

[Formation of thermosensitive recording layer]

A mixture of the following components was independently pulverized and dispersed in a sand grinder for 2 to 4 hours, so that a liquid A and a liquid B were prepared:

| | Parts by Weight |
|---|---|
| [Liquid A] | |
| 3-(N-methyl-N-cyclohexyl)amino-6-methyl-7-anilinofluoran | 10 |
| 10% aqueous solution of polyvinyl alcohol | 10 |
| Water | 80 |
| [Liquid B] | |
| 4-hydroxyphenyl-4'-isopropoxyphenyl sulfone | 10 |
| Calcium carbonate | 10 |
| 1,1,3-tris(2-methyl-4-hydroxy-5-cyclohexylphenyl)butane | 5 |
| 10% aqueous solution of polyvinyl alcohol | 20 |

-continued

| | Parts by Weight |
|---|---|
| Water | 55 |

Each of the liquid A and liquid B was further dispersed in a sand mill for 24 hours to obtain the respective dispersions. The liquid A and liquid B were mixed with stirring at a weight ratio of 1:3, so that a thermosensitive recording layer coating liquid was obtained. The thermosensitive recording layer coating liquid was coated on a sheet of commercially available high quality paper with a basis weight of 50 g/m$^2$, serving as a support, in a coating amount of 5 g/m$^2$ on a dry basis, and then dried. Thus, a thermosensitive recording layer was formed on the support.

[Preparation of coating liquid for protective layer, undercoat layer or backcoat layer]

The following components were mixed to prepare a coating liquid for a protective layer, undercoat layer or backcoat layer:

| | Parts by Weight |
|---|---|
| Kaolin dispersion | 20 |
| Resin (shown in Table 1) | 40 |
| 10% aqueous solution of cross-linking agent (shown in Table 1) | 1 |
| Water | 49 |

The above-prepared coating liquid was coated on the above prepared thermosensitive recording layer in an amount of 3 g/m$^2$ on a dry basis, and dried, so that a protective layer was formed on the thermosensitive recording layer.

When an undercoat layer was provided as indicated in Table 1, the above-prepared coating liquid was coated on the support in an amount of 3 g/m$^2$ on a dry basis and dried before the formation of the thermosensitive recording layer. In the case of a backcoat layer, the above-prepared coating liquid was coated on the back side of the support in an amount of 3 g/m$^2$ on a dry basis and dried.

In accordance with the following methods, each of the thermosensitive recording materials according to the present invention obtained in Examples 1 to 8 and the comparative thermosensitive recording materials in Comparative Examples 1 to 6 was evaluated with respect to the resistance to plasticizer, the resistance to water and the resistance to heat. The results are also given in Table 1.

1. Resistance to plasticizer

Each thermosensitive recording material was caused to induce color development by bringing it into contact with a heated block so that the image density of a colored portion was 1.30 when measured by McBeth densitometer. After dioctyl adipate was applied to the colored portion on the protective layer, the recording material was allowed to stand at 30° C. for 16 hours. After 16 hours, the image density of the colored portion was measured by McBeth densitometer. Similarly, the resistance to plasticizer of the recording materials was also observed by applying dioctyl adipate to the back side of the recording materials, and allowing the recording materials to stand under the same conditions as above. After 16 hours, the image density of the colored portion was measured by McBeth densitometer.

2. Resistance to water

After each thermosensitive recording material was allowed to stand at 40° C. for 16 hours, it was immersed in water for 16 hours. Thereafter, by rubbing the protective layer or backcoat layer of the recording material with the finger, the peeling of the protective layer or backcoat layer was assessed in accordance with the following scale:

o: The protective layer (or backcoat layer) was not at all peeled.

x: The protective layer (or backcoat layer) was peeled.

3. Resistance to heat

Each recording material was caused to induce color development. The image sample thus obtained was allowed to stand at 70° C. for one hour, and then the image density of the background of the recording material was measured by McBeth densitometer. The initial density of the background of the recording material was 0.07.

|  | Parts by Weight |
|---|---|
| [Liquid D] | |
| Benzyl p-hydroxybenzoate | 10 |
| Aqueous solution of polyvinyl alcohol | 10 |
| Calcium carbonate | 20 |
| Water | 60 |

The liquid C and liquid D were mixed with stirring at a weight ratio of 1:3, so that a thermosensitive recording layer coating liquid was obtained. The thermosensitive recording layer coating liquid was coated by a coating machine on a sheet of commercially available high quality paper with a basis weight of 52 g/m$^2$, serving as a support, in a coating amount of 6.5 g/m$^2$ on a dry basis and then dried. Thus, a thermosensitive recording layer was formed on the support.

[Formation of protective layer]

TABLE 1

|  | Protective Layer | | | Presence of Backcoat Layer or Undercoat Layer | Resistance to Plasticizer | | Resistance to Water | | Heat Resistance |
|---|---|---|---|---|---|---|---|---|---|
|  | Resin (*) | Crosslinking agent() | Pigment | Pigment/resin ratio |  | P(*) | B(*) | P() | B(**) |  |
| Ex. 1 | a | X | Kaolin | 1/2 | — | 1.27 | 0.66 | o | — | 0.13 |
| Ex. 2 | a | Y | Kaolin | 1/2 | — | 1.29 | 0.58 | o | — | 0.11 |
| Ex. 3 | a | Y | Kaolin | 1/2 | Undercoat layer | 1.28 | 1.28 | o | — | 0.12 |
| Ex. 4 | a | Y | Kaolin | 1/2 | Backcoat layer | 1.29 | 1.28 | o | o | 0.11 |
| Ex. 5 | b | X | Kaolin | 1/2 | — | 1.27 | 0.60 | o | — | 0.13 |
| Ex. 6 | b | Y | Kaolin | 1/2 | — | 1.29 | 0.58 | o | — | 0.11 |
| Ex. 7 | b | Y | Kaolin | 1/2 | Undercoat layer | 1.28 | 1.28 | o | — | 0.12 |
| Ex. 8 | b | Y | Kaolin | 1/2 | Backcoat layer | 1.29 | 1.28 | o | o | 0.11 |
| Comp. Ex. 1 | a | Glyoxal | Kaolin | 1/2 | — | 0.58 | 1.28 | x | — | 0.38 |
| Comp. Ex. 2 | a | Epoxy compound (*****) | Kaolin | 1/2 | — | 1.24 | 0.60 | o | — | 0.41 |
| Comp. Ex. 3 | a | Glyoxal | Kaolin | 1/2 | Undercoat layer | 0.60 | 0.53 | x | — | 0.36 |
| Comp. Ex. 4 | a | Epoxy compound (*****) | Kaolin | 1/2 | Undercoat layer | 1.25 | 0.62 | o | — | 0.40 |
| Comp. Ex. 5 | a | Glyoxal | Kaolin | 1/2 | Undercoat layer | 0.54 | 0.60 | x | — | 0.33 |
| Comp. Ex. 6 | a | Epoxy Compound (*****) | Kaolin | 1/2 | Backcoat layer | 1.24 | 1.26 | o | — | 0.42 |

(*)a: Core-shell emulsion type resin (core:acrylonitrile polymer, shell:acrylamide-acrylic acid copolymer)
b: Acrylamide-acrylonitrile-acrylic acid copolymer (48/41/11 wt. %)
(**)X: trimethylolpropane-tri-β-aziridinyl propionate
Y: N,N'-toluene-2,4-bis(1-aziridine carboxyamide)
(***)P: DOA was applied to the protective layer side.
B: DOA was applied to the back side of the recording material.
(****)P: It was observed whether the protective layer was peeled or not.
B: It was observed whether the backcoat layer was peeled or not.
(*****)Epoxy compound represented by the following formula:

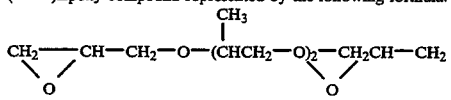

Examples 9 to 20 and Comparative Examples 7 and 8

[Formation of thermosensitive recording layer]

A mixture of the following components was independently pulverized and dispersed in a sand grinder for 5 hours, so that a liquid C and a liquid D were prepared:

|  | Parts by Weight |
|---|---|
| [Liquid C] | |
| 3-(N-methyl-N-cyclohexyl)amino-6-methyl-7-anilinofluoran | 10 |
| 10% aqueous solution of polyvinyl alcohol | 10 |
| Water | 80 |

The following components were mixed to prepare a coating liquid for a protective layer:

|  | Parts by Weight |
|---|---|
| Dispersion of pigment (shown in Table 2) | 20 |
| Resin (shown in Table 2) | 40 |
| 10% aqueous solution of crosslinking agent (shown in Table 2) | 1 |
| Zinc stearate (lubricant) | 2 |
| Water | 49 |

The thus obtained coating liquid was coated on the above prepared thermosensitive recording layer in an amount of 3 g/m$^2$ on a dry basis by the coating machine, and dried. The coated surface was subjected to super-calendering, so that a protective layer was formed on the thermosensitive recording layer. Thus, thermosensitive recording materials were obtained.

Example 21

[Formation of intermediate layer]

A mixture of the following components was dispersed with stirring in a dispersion apparatus, so that an intermediate layer coating liquid was prepared.

|  | Parts by Weight |
| --- | --- |
| Expanded plastic minute void particles (solid content: 23.4%, average particle diameter: 3 μm, and voids: 90%) | 40 |
| Styrene-butadiene copolymer latex (solid content: 47%) | 10 |
| Water | 50 |

The thus obtained intermediate layer coating liquid was coated on a sheet of commercially available high quality paper with a basis weight of 52 g/m², serving as a support, in a coating amount of 6 g/m² on a dry basis and dried, so that an intermediate layer was formed on the support.

[Formation of thermosensitive recording layer]

A mixture of the following components was independently dispersed in a sand mill until the average particle diameter reached 2 μm or less, so that a liquid E and a liquid F were prepared:

|  | Parts by Weight |
| --- | --- |
| [Liquid E] | |
| 3-(N-methyl-N-cyclohexyl)amino-6-methyl-7-anilinofluoran | 20 |
| 10% aqueous solution of polyvinyl alcohol | 20 |
| Water | 60 |
| [Liquid F] | |
| 2,4'-dihydroxydiphenylsulfone | 10 |
| 10% aqueous solution of polyvinyl alcohol | 25 |
| Calcium carbonate | 15 |
| Water | 50 |

The liquid E and liquid F were mixed with stirring at a weight ratio of 1:8, so that a thermosensitive recording layer coating liquid was obtained. The thermosensitive recording layer coating liquid was coated on the above prepared intermediate layer in a coating amount of 7 g/m² on a dry basis, and dried, so that a thermosensitive recording layer was formed on the intermediate layer.

[Formation of protective Layer]

The following components were mixed to prepare a coating liquid for a protective layer:

|  | Parts by Weight |
| --- | --- |
| Dispersion of pigment (shown in Table 2) | 20 |
| Resin (shown in Table 2) | 40 |
| 10% aqueous solution of cross- | 1 |
| linking agent (shown in Table 2) | |
| Zinc stearate (lubricant) | 2 |
| Water | 49 |

The thus obtained protective layer coating liquid was coated on the above prepared thermosensitive recording layer in an amount of 3 g/m² on a dry basis by a coating machine, and dried. The coated surface was subjected to super-calendering, so that a protective layer was formed on the thermosensitive recording layer. Thus, a thermosensitive recording material of the present invention was obtained.

In accordance with the following methods, each of the thermosensitive recording materials according to the present invention obtained in Examples 9 to 21 and the comparative thermosensitive recording materials in Comparative Examples 7 and 8 was evaluated with respect to the coloring thermosensitivity, the resistance to plasticizer, and the matching properties to a thermal head. The results are also given in Table 2.

1. Coloring thermosensitivity

To induce color formation in each thermosensitive recording material, a printing test was carried out using a commercially available printing test apparatus made by Matsushita Electronic Components Co., Ltd., under the conditions that an electric power of 0.6 W was applied to a thermal head, with the pulse width changed to 0.6 msec and 1.2 msec. The image density of the induced colored images in the recording material was measured by McBeth densitometer RD-914 to evaluate the coloring thermosensitivity of each recording material.

2. Resistance to plasticizer

A commercially available polyethylene film was attached to each printed sample obtained in the above printing test, and the printed sample was allowed to stand at 40° C. for 24 hours. The resistance to plasticizer of the printed sample was expressed by the remaining ratio of the printed sample calculated in accordance with the following formula:

$$\text{Remaining ratio of printed sample (\%)} = \frac{ID \text{ after 24 hours}}{\text{Initial } ID}$$

3. Matching properties to thermal head

After 30 km of each thermosensitive recording material was subjected to thermal printing using a thermal printer, the amount of the thermofusible material which adhered to the thermal head of the thermal printer was visually inspected and the matching properties to a thermal head was evaluated in accordance with the following scale:

⊚: There was no dust of the thermofusible material adhering to the thermal head. There was no problem in thermal printing.

o: Dust of the thermofusible material slightly adhered to the thermal head, but it had no effect on thermal printing.

x: A considerable amount of the thermofusible material adhered to the thermal head, which had a serious effect on thermal printing.

TABLE 2

| | Res-in (*) | Cross-linking agent (**) | Protective Layer | | | | Resin/ pigment ratio | Lu-bricant (g) | Coloring Thermo-sensitivity | | Resistance to Plasticizer of Recorded Images (%) | Matching Properties to Thermal Head |
|---|---|---|---|---|---|---|---|---|---|---|---|---|
| | | | Pigment | | | | | | 0.6 msec | 1.2 msec | | |
| | | | Material | Particle dia. (μm) | Oil absorption (cc) | Specific surface (m²) | | | | | | |
| Ex. 9 | c | Z | Silicon dioxide | 0.05 | 50 | 150 | 1/2 | 0.05 | 0.96 | 1.45 | 85 | ⊚ |
| Ex. 10 | d | Z | Silicon dioxide | 0.05 | 50 | 150 | 1/2 | 0.05 | 0.92 | 1.43 | 85 | ⊚ |
| Ex. 11 | c | Z | Silicon dioxide | 0.5 | 50 | 150 | 1/2 | 0.05 | 0.95 | 1.46 | 84 | ⊚ |
| Ex. 12 | c | Z | Silicon dioxide | 0.5 | 150 | 150 | 1/2 | 0.05 | 0.94 | 1.40 | 88 | ⊚ |
| Ex. 13 | c | Z | Silicon dioxide | 0.05 | 150 | 150 | 1/2 | 0.05 | 0.90 | 1.46 | 88 | ⊚ |
| Ex. 14 | c | Z | Calcium silicate | 0.5 | 100 | 150 | 1/2 | 0.05 | 0.92 | 1.45 | 87 | ⊚ |
| Ex. 15 | c | Z | Aluminum silicate | 0.5 | 150 | 150 | 1/2 | 0.05 | 0.91 | 1.47 | 88 | ⊚ |
| Ex. 16 | c | Z | Silicon dioxide | 0.05 | 50 | 150 | 2/3 | 0.05 | 0.95 | 1.28 | 85 | o |
| Ex. 17 | c | Z | Silicon dioxide | 0.05 | 50 | 200 | 1/2 | 0.05 | — | 1.45 | 88 | ⊚ |
| Ex. 18 | a | V | Silicon dioxide | 0.05 | 50 | — | 1/2 | 0.05 | 0.95 | 1.45 | 86 | ⊚ |
| Ex. 19 | a | K | Silicon dioxide | 0.05 | 50 | — | 1/2 | 0.05 | 0.92 | 1.46 | 84 | ⊚ |
| Ex. 20 | a | H | Silicon dioxide | 0.05 | 50 | — | 1/2 | 0.05 | 0.95 | 1.43 | 83 | ⊚ |
| Ex. 21 | a | V | Silicon dioxide | 0.05 | 50 | — | 1/2 | 0.05 | 1.20 | 1.46 | 85 | ⊚ |
| Comp. Ex. 7 | e | Z | Silicon dioxide | 0.05 | 50 | 150 | 1/2 | 0.05 | 0.90 | 1.37 | 65 | x |
| Comp. Ex. 8 | e | Z | Silicon dioxide | 0.05 | 50 | 80 | 1/2 | 0.05 | — | 1.30 | 75 | o |

(*)a: Same as in Table 1.
c: Core-shell emulsion type resin (core:acrylonitrile polymer, Shell:acrylamide-acrylic acid copolymer), "XFE1845" (Trademark), made by Mitsui Toatsu Chemicals, Inc.
d: Acrylonitrile-acrylamide-acrylic acid copolymer, "Hari Coat TS20" (Trademark), made by Harima Chemicals, Inc.
e: Carboxyl-group-modified polyvinyl alcohol
(**)Z: Aziridine compound (B1), "TAZM" (Trademark), made by Sogo Pharmaceutical Co., Ltd.
V: Carbodiimide compound (B2)
K: Methyl ethyl Ketoxime compound (B3)
H: Bis(β-hydroxyethyl)sulfone (B4)

In addition, the thermosensitive recording materials according to the present invention obtained in Examples 18 to 21 were subjected to evaluation of the resistance to plasticizer, the resistance to water, and the heat resistance in the same manner as above. The results are shown in Table 3.

matching properties to a thermal head are upgraded, and the colored images formed on the recording material are superior with respect to the preservability, such as the resistance to plasticizer.

When the backcoat layer or the undercoat layer comprising the same resin and crosslinking agent as used in

TABLE 3

| | Resin | Cross-linking agent | Protective Layer | | | | Lubricant (g) | Presence of Intermediate Layer | Resistance to Plasticizer | | Resistance to Water | | Heat Resistance |
|---|---|---|---|---|---|---|---|---|---|---|---|---|---|
| | | | Pigment | | | Resin/ pigment ratio | | | | | | | |
| | | | Material | Particle dia. (μm) | Oil absorption (cc) | | | | P | B | P | B | |
| Ex. 18 | a | V | Silicon dioxide | 0.05 | 50 | 1/2 | 0.05 | — | 1.28 | 1.28 | o | o | 0.14 |
| Ex. 19 | a | K | Silicon dioxide | 0.05 | 50 | 1/2 | 0.05 | — | 1.30 | 1.29 | o | o | 0.14 |
| Ex. 20 | a | H | Silicon dioxide | 0.05 | 50 | 1/2 | 0.05 | — | 1.27 | 1.30 | o | o | 0.12 |
| Ex. 21 | a | V | Silicon dioxide | 0.05 | 50 | 1/2 | 0.05 | o | 1.28 | 1.27 | o | o | 0.14 |

As previously explained, since the protective layer of the thermosensitive recording material according to the present invention comprises a resin component A1 or A2, and a crosslinking agent selected from the group consisting of B1, B2, B3 and B4, the resistance to water, heat and plasticizer of the obtained recording material can be improved.

Furthermore, when the protective layer further comprises a silicon oxide compound as a pigment, the coloring thermosensitivity of the recording material and the the above-mentioned protective layer is provided in the thermosensitive recording material of the present invention, the resistance to water and chemicals of the recording material is further improved.

In addition, when the intermediate layer comprising the expanded plastic minute void particles is formed between the support and the thermosensitive recording layer, the coloring thermosensitivity can be improved.

What is claimed is:

1. A thermosensitive recording material, comprising a support, a thermosensitive recording layer formed on said support, capable of producing colored images by heating, and a protective layer formed on said thermosensitive recording layer, which comprises a resin component, comprising:
   i) a copolymer resin obtained by copolymerization of acrylamide or methacrylamide, acrylonitrile and a vinyl monomer having a carboxyl group, or a copolymer resin of coreshell emulsion obtained by copolymerization of acrylamide or methacrylamide or both in the presence of a seed emulsion of an acrylic-containing copolymer or methacrylic-containing copolymer, and
   ii) an effective amount of crosslinking agent comprising at least one compound having two or more ethyleneimino groups therein.

2. The thermosensitive recording material as claimed in claim 1, wherein said resin component in said protective layer is said copolymer resin obtained by copolymerization of acrylamide or methacrylamide, acrylonitrile, and a vinyl monomer having a carboxyl group.

3. The thermosensitive recording material as claimed in claim 2, wherein said protective layer further comprises a pigment comprising a silicon oxide compound.

4. The thermosensitive recording material as claimed in claim 3, wherein the weight ratio of said pigment to said resin component is 1 or less in said protective layer.

5. The thermosensitive recording material as claimed in claim 2, wherein the ratio by wt. % of acrylamide or methacrylamide, acrylonitrile, and said vinyl monomer having a carboxyl group is (45 to 85) : (10 to 50) : (3 to 20).

6. The thermosensitive recording material as claimed in claim 2, wherein said vinyl monomer having a carboxyl group is selected from the group consisting of acrylic acid, methacrylic acid, and maleic acid.

7. The thermosensitive recording material as claimed in claim 1, wherein said resin component in said protective layer is said copolymer resin of a core-shell emulsion obtained by copolymerization of acrylamide and/or metacrylamide in the presence of said seed emulsion of said acryl-based copolymer or methacryl-based copolymer.

8. The thermosensitive recording material as claimed in claim 7, wherein said protective layer further comprises a pigment comprising a silicon oxide compound.

9. The thermosensitive recording material as claimed in claim 8, wherein the weight ratio of said pigment to said resin component is 1 or less in said protective layer.

10. The thermosensitive recording material as claimed in claim 1, wherein said protective layer further comprises a pigment comprising a silicon oxide compound.

11. The thermosensitive recording material as claimed in claim 10, wherein the weight ratio of said pigment to said resin component is 1 or less in said protective layer.

12. The thermosensitive recording material as claimed in claim 10, wherein said silicon oxide compound is selected from the group consisting of silicon dioxide, calcium silicate and zinc silicate.

13. The thermosensitive recording material as claimed in claim 1, wherein said protective layer further comprises a pigment comprising a silicon oxide compound.

14. The thermosensitive recording material as claimed in claim 13, wherein the weight ratio of said pigment to said resin component is 1 or less in said protective layer.

15. The thermosensitive recording material as claimed in claim 1, wherein the ratio by wt. % of acrylamide or methacrylamide, acrylonitrile, and said vinyl monomer having a carboxyl group is (45 to 85) : (10 to 50) : (3 to 20).

16. The thermosensitive recording material as claimed in claim 1, wherein the ratio by wt. % of acrylamide or methacrylamide, acrylonitrile, and said vinyl monomer having a carboxyl group is (45 to 85) : (10 to 50) : (3 to 20).

17. The thermosensitive recording material as claimed in claim 1, wherein said vinyl monomer having a carboxyl group is selected from the group consisting of acrylic acid, methacrylic acid and maleic acid.

18. The thermosensitive recording material as claimed in claim 1, further comprising an undercoat layer provided between said support and said thermosensitive recording layer.

19. The thermosensitive recording material as claimed in claim 1, further comprising a backcoat layer provided on the back side of said support, opposite to said thermosensitive recording layer with respect to said support.

20. The thermosensitive recording material as claimed in claim 19, wherein said backcoat layer comprises said resin component and said cross-linking agent comprising at least one compound having two or more ethyleneimino groups therein.

21. The thermosensitive recording material as claimed in claim 1, further comprising an intermediate layer provided between said support and said thermosensitive recording layer.

22. The thermosensitive recording material as claimed in claim 21, wherein said intermediate layer comprises expanded plastic minute void particles.

23. The thermosensitive recording material as claimed in claim 1, wherein said protective layer further comprises a natural resin selected from the group consisting of sodium alginate, starch, casein and cellulose; or a synthetic resin selected from the group consisting of polyvinyl alcohol, a polycarboxylic acid compound and polyacrylamide.

24. The thermosensitive recording material as claimed in claim 23, wherein a polyvinyl alcohol is used having a saponification degree of 0.5% or less.

25. The thermosensitive recording material as claimed in claim 1, wherein said crosslinking agent is selected from the group consisting of those of the formula:

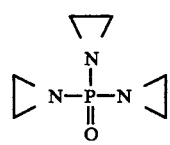
(1)

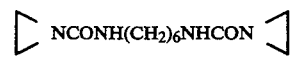
(2)

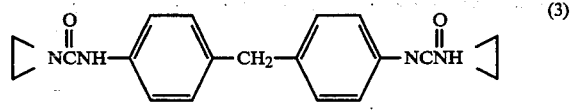
(3)

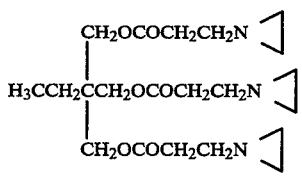 (4)
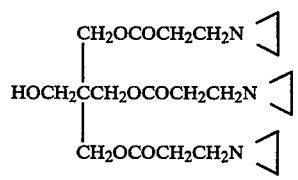 (5)
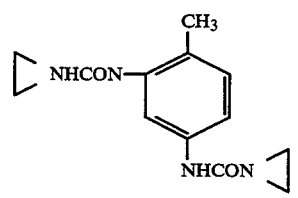 (6)
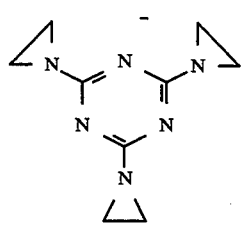 (7)
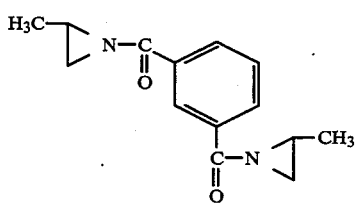 (8)
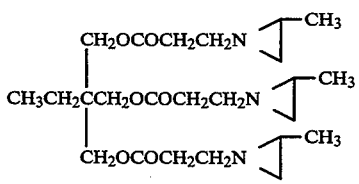 (9)
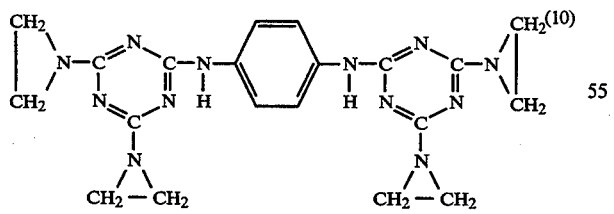 (10)
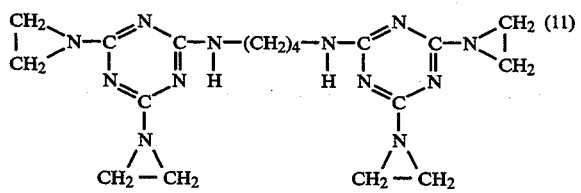 (11)
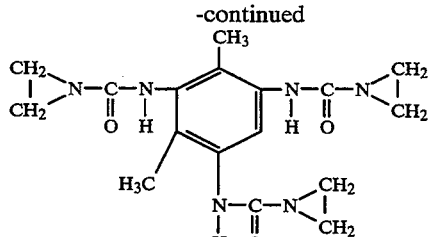 (12)
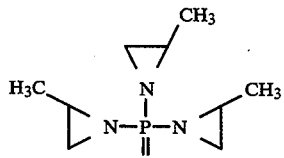 (13)
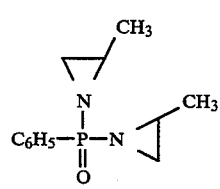 (14)
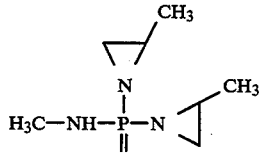 (15)
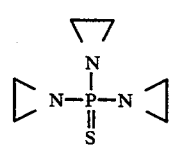 (16)
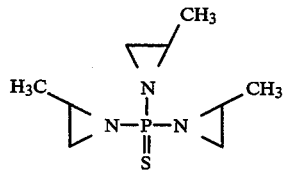 (17)
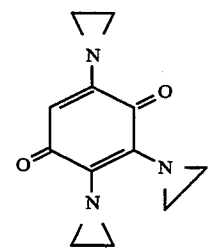 (18)
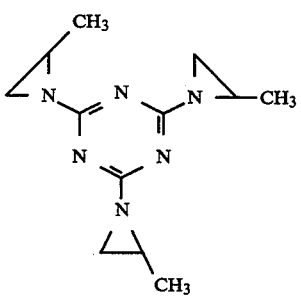 (19)

-continued

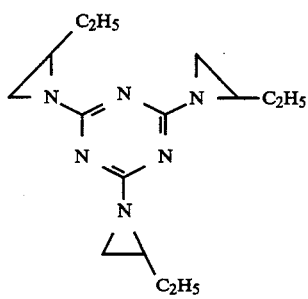
(20)

-continued

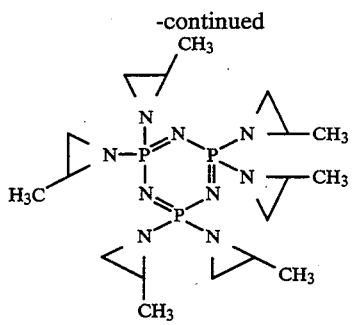
(21)

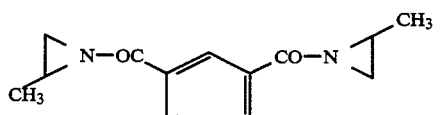
(22)

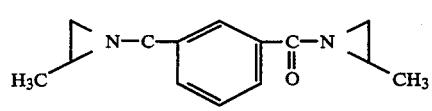
(23)

26. The thermosensitive recording material as claimed in claim 1, which forms colored images by the reaction between a diazo compound and a coupler, between a leuco dye and a color developer or between an isocyanate and an amine.

27. The thermosensitive recording material as claimed in claim 1, wherein said undercoat layer comprises said resin component and said cross-linking agent comprising at least one compound having two or more ethyleneimino groups therein.

* * * * *

UNITED STATES PATENT AND TRADEMARK OFFICE
CERTIFICATE OF CORRECTION

PATENT NO. : 5,409,881

DATED : April 25, 1995

INVENTOR(S) : MORI, ET AL.

It is certified that error appears in the above-identified patent and that said Letters Patent is hereby corrected as shown below:

Title page, col. 2,
Abstract, line 7 "arylamide" should read --acrylamide--.

Column 1, line 16, "thermasensitive" should read --thermosensitive--.

Column 1, line 47, "ad dioctyl" should read --and dioctyl--.

Column 11, line 26, "one such" should read --of such--.

UNITED STATES PATENT AND TRADEMARK OFFICE
CERTIFICATE OF CORRECTION

PATENT NO. : 5,409,881

DATED : April 25, 1995

INVENTOR(S) : MORI, ET AL.

It is certified that error appears in the above-identified patent and that said Letters Patent is hereby corrected as shown below:

Column 17, line 52 "was:obtained" should read --was obtained--.

Column 21, line 42, "metacrylamide" should read --methacrylamide--.

Signed and Sealed this

Second Day of July, 1996

BRUCE LEHMAN

*Attest:*

*Attesting Officer*  *Commissioner of Patents and Trademarks*